(12) United States Patent
Schmidt

(10) Patent No.: US 10,179,490 B2
(45) Date of Patent: Jan. 15, 2019

(54) A-ARM SUSPENSION SYSTEMS

(71) Applicant: Vantage Mobility International, LLC, Phoenix, AZ (US)

(72) Inventor: Michael J. Schmidt, Queen Creek, AZ (US)

(73) Assignee: Vantage Mobility International, LLC, Phoenix, AZ (US)

(*) Notice: Subject to any disclaimer, the term of this patent is extended or adjusted under 35 U.S.C. 154(b) by 0 days.

(21) Appl. No.: 15/972,546

(22) Filed: May 7, 2018

(65) Prior Publication Data

US 2018/0250996 A1    Sep. 6, 2018

Related U.S. Application Data

(62) Division of application No. 15/492,200, filed on Apr. 20, 2017, now Pat. No. 9,987,896.

(60) Provisional application No. 62/326,516, filed on Apr. 22, 2016, provisional application No. 62/376,656, filed on Aug. 18, 2016.

(51) Int. Cl.
*B60G 3/20* (2006.01)
*B60G 7/00* (2006.01)
*B62D 65/12* (2006.01)

(52) U.S. Cl.
CPC ............... *B60G 3/20* (2013.01); *B60G 7/001* (2013.01); *B60G 7/005* (2013.01); *B60G 7/008* (2013.01); *B62D 65/12* (2013.01); *B60G 2200/144* (2013.01); *B60G 2200/18* (2013.01); *B60G 2200/464* (2013.01); *B60G 2200/4622* (2013.01); *B60G 2204/143* (2013.01); *B60G 2206/011* (2013.01); *B60G 2206/50* (2013.01)

(58) Field of Classification Search
CPC .......... B60G 3/20; B60G 7/001; B60G 7/008; B60G 2204/143; B60G 2200/18
See application file for complete search history.

(56) References Cited

U.S. PATENT DOCUMENTS

| | | | | | |
|---|---|---|---|---|---|
| 3,823,957 | A | * | 7/1974 | Bishop | B60G 3/00 280/124.141 |
| 5,284,353 | A | * | 2/1994 | Shinji | B60G 3/20 280/124.136 |
| 2008/0258419 | A1 | * | 10/2008 | Baroni | B60G 3/20 280/124.157 |

* cited by examiner

*Primary Examiner* — Faye M Fleming
(74) *Attorney, Agent, or Firm* — Fennemore Craig, P.C.

(57) ABSTRACT

An A-arm suspension system may include a frame that defines respective left and right rear body mounting locations at about a rear end of the frame and respective left and right front body mounting locations at about a front end of the frame. Left and right side control arms are pivotally mounted to left and right sides of said frame so that at least portions of the left and right side control arms are generally aligned with the respective left and right front body mounting locations on the frame. Left and right side A-arms are pivotally mounted to the left and right sides of the frame assembly in generally spaced-apart relation to the respective left and right side control arms so that the control arms and the A-arms define respective left and right side ball joint axes. Left and right side wheel spindle assemblies are mounted to the respective left and right side control and A-arms.

19 Claims, 7 Drawing Sheets

A-ARM SUSPENSION SYSTEMS

CROSS-REFERENCE TO RELATED APPLICATIONS

This application is a divisional of U.S. patent application Ser. No. 15/492,200, filed on Apr. 20, 2017, now U.S. Pat. No. 9,987,896, which claims the benefit of U.S. Provisional Patent Application Nos. 62/326,516, filed on Apr. 22, 2016, and 62/376,656, filed on Aug. 18, 2016, all of which are hereby incorporated herein by reference for all that they disclose.

TECHNICAL FIELD

The present invention relates to vehicle suspension systems in general and more specifically to modified vehicle suspension systems of the type commonly used in converting vehicles for wheelchair use.

BACKGROUND

Systems for converting vehicles for wheelchair use are well-known in the art and usually involve a wide range of additions and modifications to allow persons with limited mobility to more easily gain access to and/or operate such converted vehicles. For example, such vehicles are typically modified to include deployable ramp systems to allow persons in wheeled assistance devices, such as wheelchairs, scooters, and the like to enter the vehicles, either to operate the vehicles or to ride along. In addition, it is often necessary to modify the vehicle suspension systems to provide the additional space or clearance required by the deployable ramp systems. If carefully designed, the suspension system modifications may also allow for an increase in the flat floor area within the modified vehicles, thereby providing additional space with the modified vehicles for maneuvering the wheeled assistance devices.

While a wide variety of suspension system modifications have been developed and used for such purposes, newer vehicle suspension systems continue to pose additional challenges in modifying the suspension systems to provide the desired benefits. Moreover, it is also desirable to reuse as many components of the stock suspension system as possible.

SUMMARY OF THE INVENTION

One embodiment of a method of mounting to an A-arm suspension system a wheel spindle configured for use with a multi-link suspension system may involve the steps of: Removing at least one suspension link mount on the wheel spindle; mounting a ball joint bracket to the wheel spindle, the ball joint bracket being configured to mount to the A-arm suspension system, the removing and mounting steps producing a modified wheel spindle; and mounting the modified wheel spindle to the A-arm suspension system.

Also disclosed is a ball joint bracket having a spindle plate with an upper end and a lower end. A ball joint plate extends generally outwardly from the lower end of the spindle plate. A gusset plate extends between the spindle plate and the ball joint plate.

An A-arm suspension system according to one embodiment of the present invention may include a frame that defines respective left and right rear body mounting locations at about a rear end of the frame and respective left and right front body mounting locations at about a front end of the frame. A right side control arm is pivotally mounted to a right side of said frame so that at least a portion of the right side control arm is generally aligned with the right front body mounting location on the frame. A right side A-arm is pivotally mounted to the right side of the frame assembly in generally spaced-apart relation to the right side control arm so that the right side control arm and the right side A-arm define a right side ball joint axis. A left side control arm is pivotally mounted to a left side of the frame so that at least a portion of the left side control arm is generally aligned with the left front body mounting location on the frame. A left side A-arm is pivotally mounted to the left side of the frame in generally spaced-apart relation to the left side control arm so that the left side control arm and the left side A-arm define a left side ball joint axis. A right side wheel spindle assembly is mounted to the right side control arm and the right side A-arm. A left side wheel spindle assembly is mounted to the left side control arm and the left side A-arm.

BRIEF DESCRIPTION OF THE DRAWINGS

Illustrative and presently preferred exemplary embodiments of the invention are shown in the drawings in which.

DETAILED DESCRIPTION OF THE PREFERRED EMBODIMENTS

Figure 1:
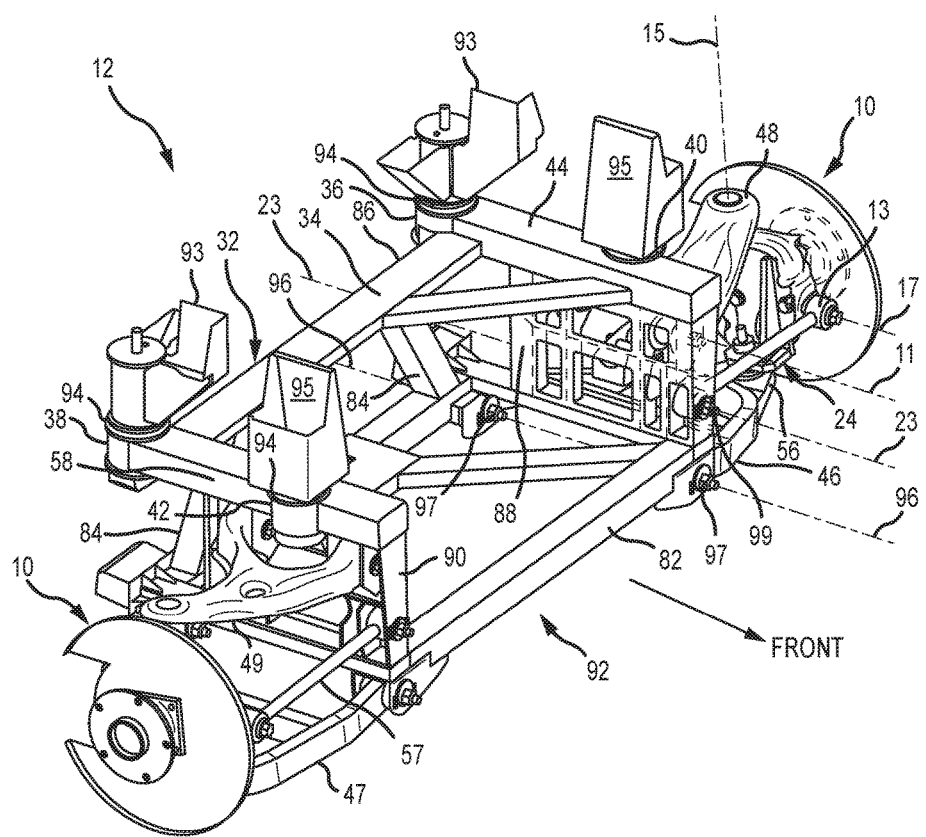
FIG. 1 is a perspective view from the right front of an A-arm suspension system and wheel spindle assembly according to one embodiment of the present invention.
Figure 2:
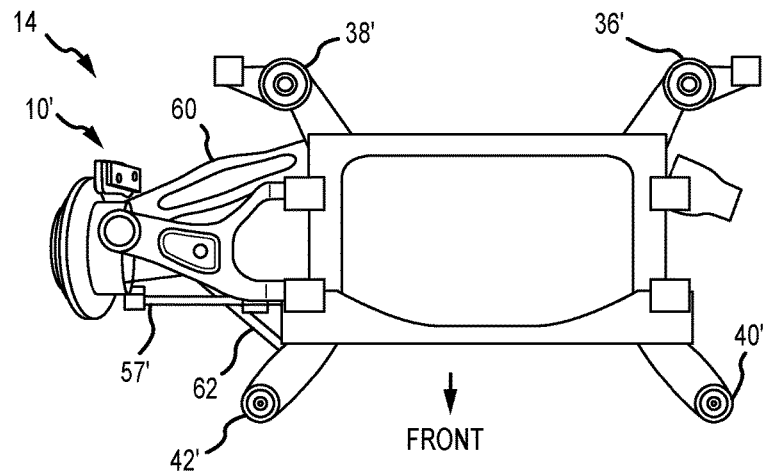
FIG. 2 is a plan view of an OEM multi-link suspension system showing the arrangement of a right-hand side wheel spindle suspension assembly.
Figure 3:
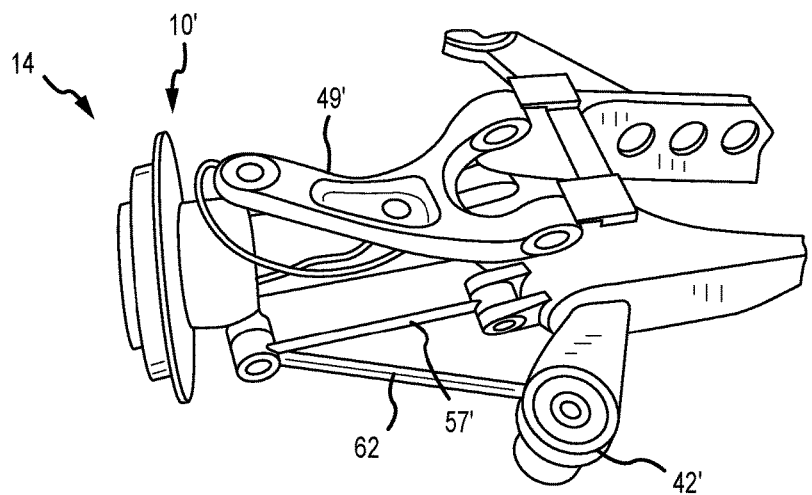
FIG. 3 is an enlarged perspective view from the right front of the right-hand side wheel spindle suspension assembly illustrated in FIG. 2.
Figure 11:
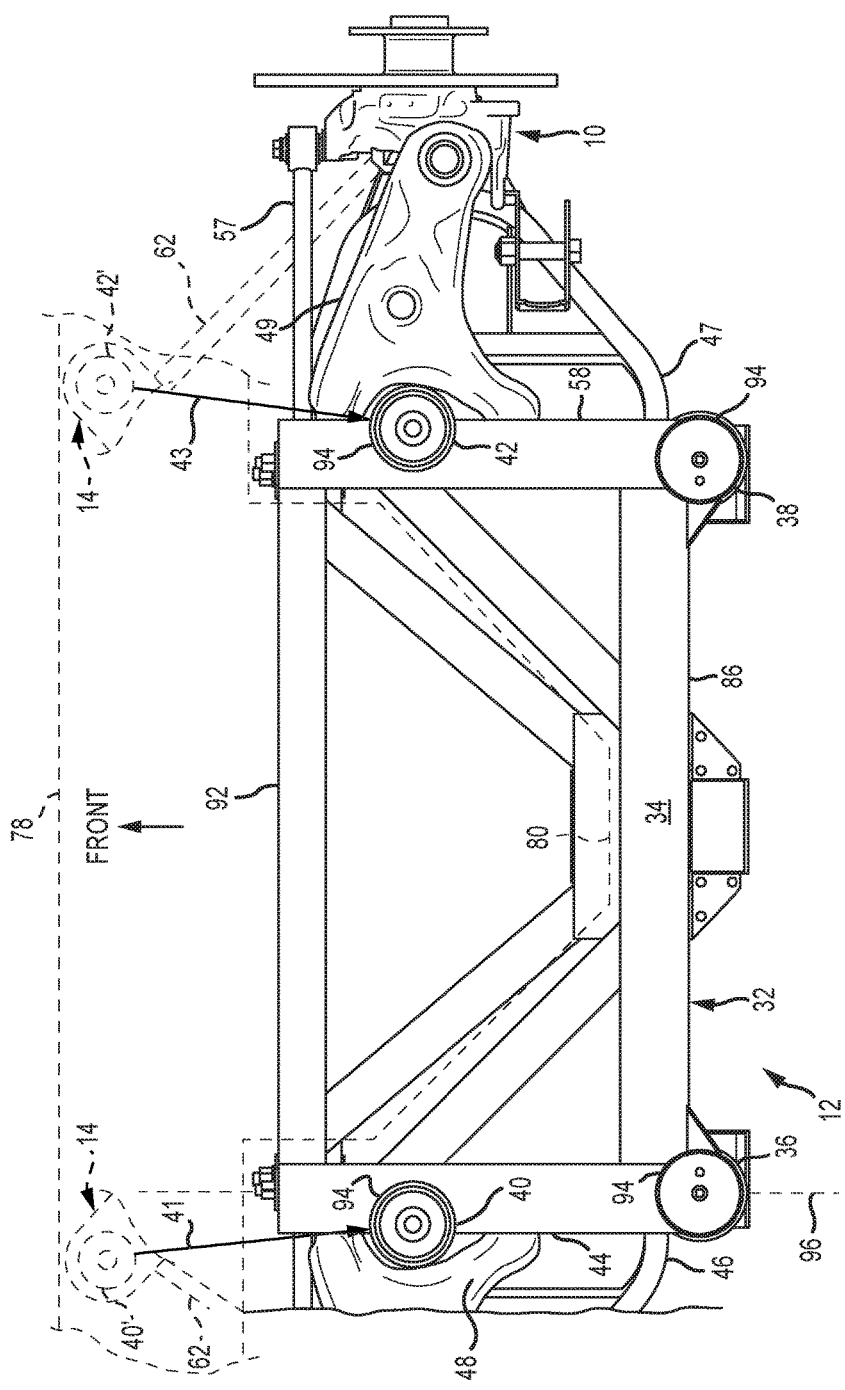
FIG. 11 is a is a top view of a portion of the A-arm suspension system of FIG. 1 showing the right side suspension and spindle assembly and with overlain portions of the OEM suspension system illustrated in FIG. 2 to illustrate the differences between the two suspension systems and the increased space available for a flat floor area.

A wheel spindle assembly 10 according to one embodiment of the present invention is shown and described herein as it could be used in conjunction with an A-arm suspension system 12, as best seen in FIG. 1. The A-arm suspension system 12 may be used to replace a multi-link original equipment manufacturer (OEM) suspension system 14, an example of which is illustrated in FIGS. 2 and 3. Such a replacement or substitution will allow a vehicle (not shown) designed to receive the multi-link OEM suspension system 14 to be more easily converted for wheelchair use. In addition, the replacement of the OEM suspension system 14 with the A-arm suspension system 12 will also allow the modified vehicle to have increased interior space and flat floor area, as best seen in FIG. 11. Alternatively, other applications are possible.

Because the A-arm suspension system 12 of FIG. 1 may be used to replace the multi-link OEM suspension system 14 of FIGS. 2 and 3, it will be generally preferred, but not required, to use in the A-arm suspension system 12 as many components as possible from the OEM suspension system 14. Such components may include, for example, various control arms, suspension links, struts, body support bushings, and ball joints. In addition, and in the embodiments shown and described herein, the OEM wheel spindle assemblies 10' from the OEM suspension system 14 may be modified or adapted for use with the A-arm suspension system 12. In such embodiments, then, the wheel spindle assemblies 10 of A-arm suspension system 12 will comprise modified versions of the OEM wheel spindle assemblies 10'. Stated somewhat differently, the OEM spindles 10' may be modified as described herein so that they may used with or retrofitted to the A-arm suspension system 12, but as wheel spindle assemblies 10.

Figure 5:
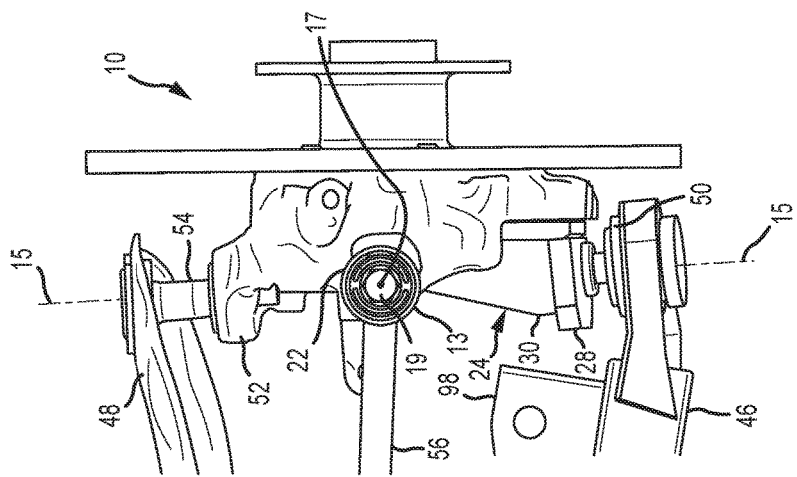
FIG. 5 is an enlarged front view in elevation of the modified left side spindle and ball joint bracket assembly illustrated in FIG. 4 showing the alignment of the relocated toe mount and ball joint axis.
Figure 6:
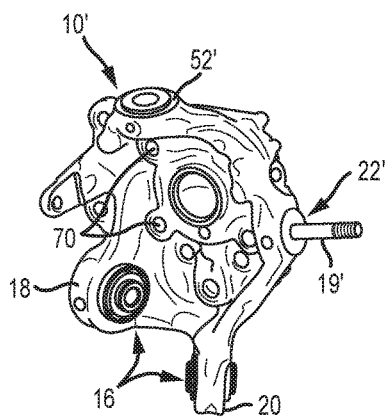
FIG. 6 is a perspective view of an unmodified OEM left side wheel spindle assembly.
Figure 7:
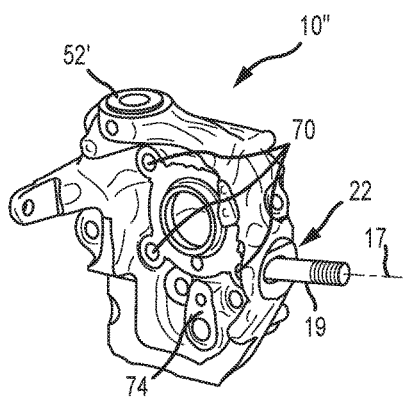
FIG. 7 is a perspective view of a left side wheel spindle assembly of FIG. 6 but with the lower suspension link mounts removed and also showing the relocated toe link mount.
Figure 8:
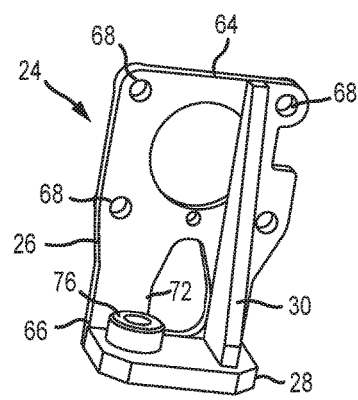
FIG. 8 is a perspective view of one embodiment of a left side ball joint bracket.
Figure 9:
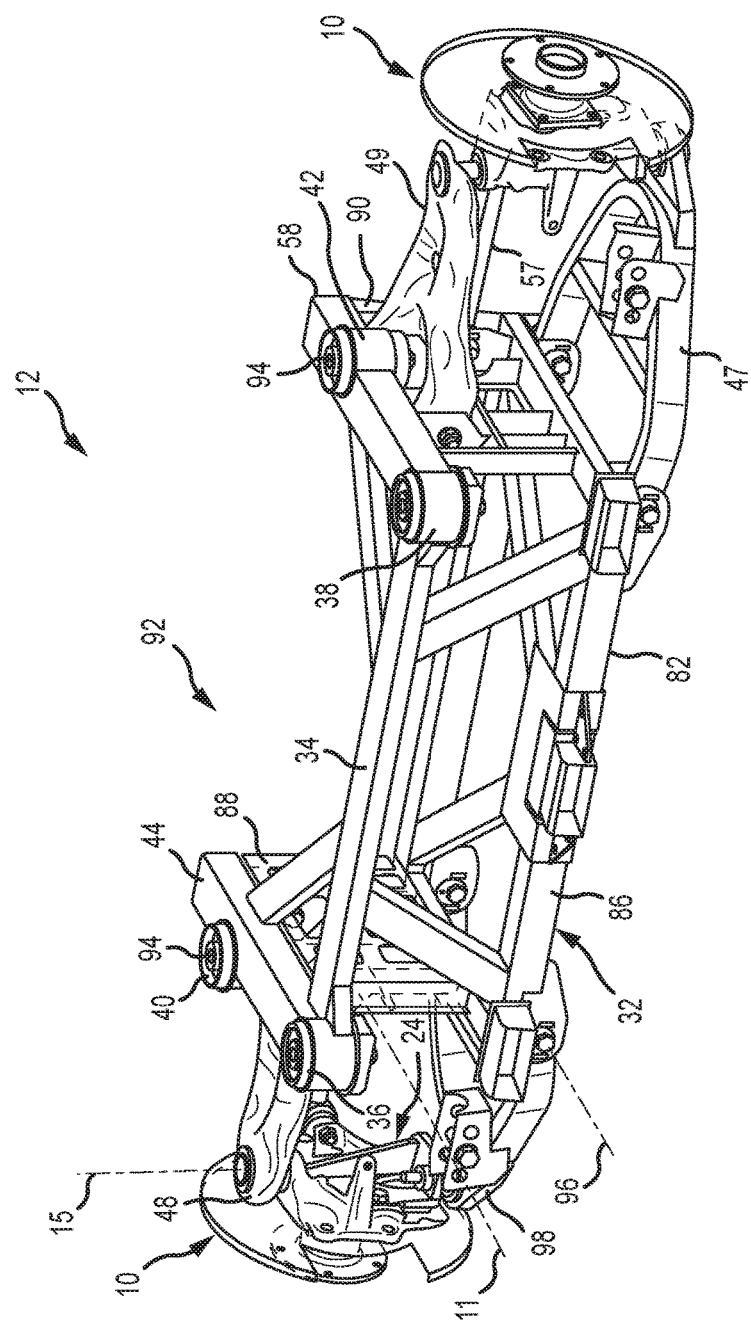
FIG. 9 is a perspective view from the right rear of the A-arm suspension system illustrated in FIG. 1.

Referring now to FIGS. 4-8, the wheel spindle assembly 10 (illustrated in FIGS. 4 and 5) used in A-arm suspension system 12 may comprise a modified version of the OEM spindle assembly 10' (illustrated in FIG. 6). In one embodiment, and as best seen in FIG. 6, OEM spindle assembly 10' may comprise one or more suspension link mounts 16, such as first and second lower bushing mounts 18 and 20. The first and second lower bushing mounts 18 and 20 are required for the OEM multi-link suspension system 14, but are not required for A-arm suspension system 12. As will be described in much greater detail herein, the first and second lower bushing mounts 18 and 20 may be removed to produce an intermediate modified spindle 10" illustrated in FIG. 7. A ball joint bracket 24 then may be mounted to the intermediate modified spindle 10" of FIG. 7 to produce the spindle assembly 10 of FIGS. 4 and 5. Ball joint bracket 24 is best seen in FIG. 8 and may comprise a spindle plate 26, a ball joint plate 28, and a gusset 30.

OEM spindle assembly 10' may also comprise a toe link mount 22', again as best seen in FIG. 6. As will also be described in much greater detail herein, in many embodiments it will be necessary or desirable to move or relocate the toe link mount 22' of OEM spindle assembly 10' (illustrated in FIG. 6) to define a relocated toe link mount 22 (illustrated in FIG. 7). Relocated toe link mount 22 will allow the A-arm suspension system 12 to retain OEM specifications relating to toe changes as a function of suspension travel.

Referring now to FIGS. 1 and 9-11, the A-arm suspension system 12 utilizing the modified wheel spindles 10 may comprise a frame 32. Frame 32 is sized and configured to receive the various elements and components of suspension system 12 and to allow the A-arm suspension system 12 to mount to a vehicle (not shown) originally configured for the multi-link OEM suspension system 14 illustrated in FIGS. 2 and 3. To this end, an upper or top member 34 of frame 32 may define a plurality of body or chassis mounting locations 36, 38, 40, and 42 to allow the A-arm suspension system 12 to be mounted to the body or chassis of the vehicle (not shown). In one embodiment, the respective left and right rear body mounting locations 36 and 38 may be sized and spaced to correspond to the rear body mounting locations 36' and 38' provided on the OEM suspension assembly 14. See also FIG. 2. This will allow the left and right rear body mounting locations 36 and 38 provided on upper or top member 34 of frame 32 to be aligned with corresponding rear suspension mounts provided on the vehicle chassis.

However, the respective left and right front body mounting locations 40 and 42 may be moved generally rearwardly i.e., in the directions indicated by respective arrows 41 and 43 in FIG. 11, compared to the corresponding front body mounting locations 40' and 42' provided on the OEM suspension assembly 14. While the relocated left and right front body mounting locations 40 and 42 provide increased clearance to allow a deployable ramp system to be installed on the vehicle (and also permits the vehicle to be provided with increased interior space and a flat floor area), the relocation of the left and right front body mounting locations 40 and 42 also necessitates many of the modifications structural features of the A-arm suspension system 12 described herein. Again, such modifications will allow the A-arm suspension system 12 to effectively substituted for the OEM suspension system 14.

Figure 4:
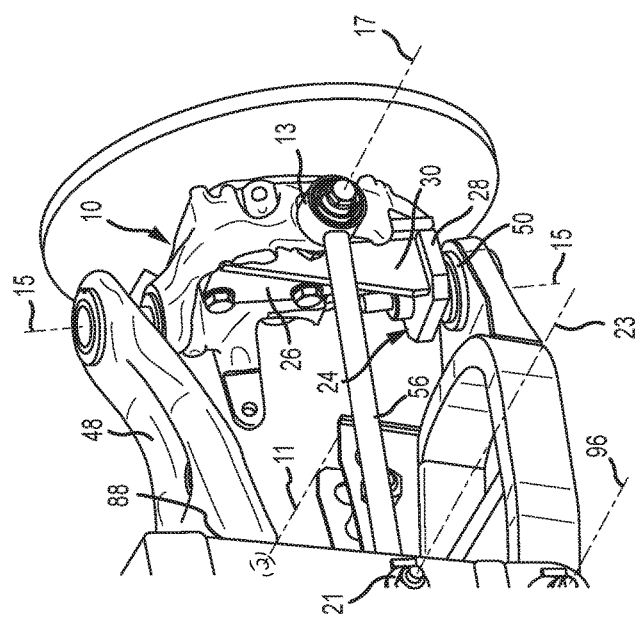
FIG. 4 is an enlarged perspective view from the front of a modified left side spindle and ball joint bracket assembly shown mounted to the lower A-arm and upper control arm of the A-arm suspension assembly.
Figure 10:
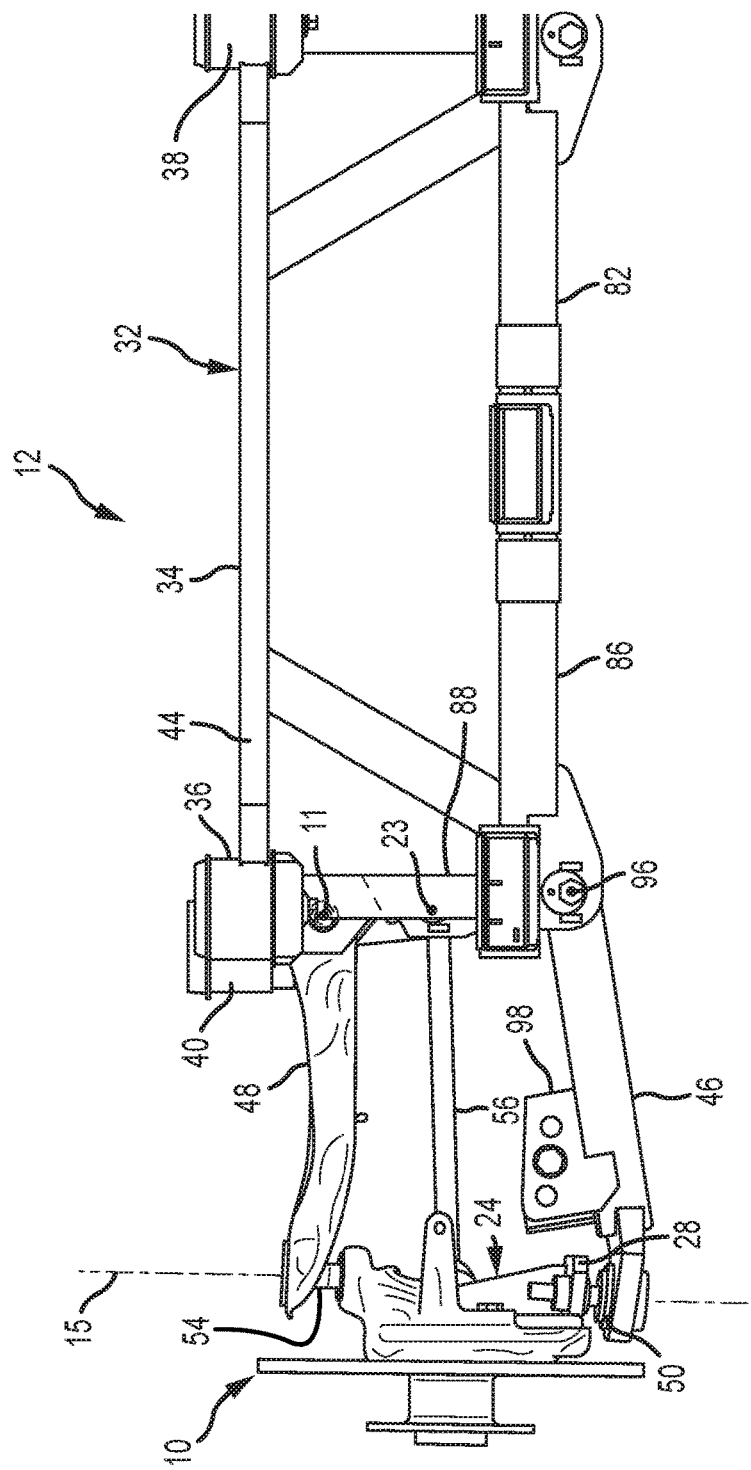
FIG. 10 is a rear view in elevation of a portion of the A-arm suspension system illustrated in FIGS. 1 and 9 showing the left side suspension and spindle assembly.

Referring now to FIGS. 4, 5, and 10, the left-hand side wheel spindle assembly 10 may be mounted to a left-hand side 44 of frame assembly 32 via a lower A-arm 46 and an upper control arm 48. More specifically, the ball joint plate 28 of ball joint bracket 24 may be mounted to a lower ball joint 50 provided on lower A-arm 46. Similarly, the upper ball joint mount 52 provided on wheel spindle assembly 10 may be mounted to an upper ball joint 54 provided on the upper control arm 48. A toe link 56 is mounted between wheel spindle assembly 10 and left-hand side 44 of frame assembly 32. Of course, the right-hand side wheel spindle assembly 10 may be mounted to a right-hand side 58 of frame assembly 32 in the same manner, i.e., via a lower A-arm 47, an upper control arm 49, and a toe link 57. See FIGS. 1 and 9.

A significant advantage of the A-arm suspension system of present invention is that it may be used replace a multi-link rear suspension system, such as OEM suspension system 14, while retaining key aspects of the OEM suspension system geometry and performance specifications, such as camber, caster, and toe. By eliminating the forward control link of the OEM multi-link suspension, the A-arm suspension system of the present invention provides the space required for a deployable ramp system. In addition, the re-location to a more rearward position of the forward body mounts of the A-arm suspension system increases passenger volume and allows for a substantial increase in the flat floor area within the converted vehicle.

Still yet another advantage of the A-arm suspension system of the present invention is that it allows many components of the OEM multi-link suspension system, such as the upper control arms, ball joints, and body bushings, to be reused in the A-arm suspension system, thereby significantly reducing the costs associated with vehicle conversion. Still other advantages are associated with the ball joint brackets. For example, the ball joint brackets involve few components and are relatively easy to fabricate. Further, the ball joint brackets require only minimal modifications to the OEM wheel spindle assemblies, which again reduces the overall cost of the conversion system.

Having briefly described one embodiment of the suspension system of present invention, as well as some of its more significant features and advantages, various embodiments and alternative configurations of the present invention will now be described in detail. However, before proceeding with the description, it should be noted that while various embodiments of the present invention are shown and described herein as they could be used to convert a vehicle for wheelchair use, the devices, systems, and methods of the present invention could also be used in conjunction with any of a wide range of vehicle types and for use in a wide range of applications. Consequently, the present invention should not be regarded as limited to the particular types of vehicles, applications, and circumstances shown and described herein.

Referring back now to FIGS. 1-5, one embodiment of a wheel spindle or 'knuckle' assembly 10 is shown and described herein as it could be used in conjunction with an A-arm suspension system 12. The wheel spindle or knuckle assemblies 10 used on the left- and right-hand sides 44 and 58 of the suspension system 12 may comprise modified versions of the left- and right-hand side OEM wheel spindle assemblies 10' from the OEM multi-link suspension system 14. With reference now specifically to FIGS. 2, 3, and 6, each OEM wheel spindle assembly 10' may be provided with a plurality of suspension link mounts 16 to allow the OEM wheel spindle assembly 10' to be attached to the OEM multi-link suspension system 14. For example, in the particular embodiment shown and described herein, the OEM wheel spindle assembly 10' may be provided with respective first and second bushing mounts 18 and 20, as best seen in FIG. 6. First bushing mount 18 is configured to receive a rear lower control link 60 on OEM suspension system 14, as best seen in FIG. 2. In this regard it should be noted that only the right-hand side rear lower control link 60 is illustrated in FIG. 2, whereas the OEM wheel spindle assembly 10' illustrated in FIG. 6 is for the left-hand side. Thus, the rear lower control link 60 that would mount to the first bushing mount 18 on left-hand side wheel spindle 10' is not illustrated in FIG. 2, but the arrangement is the same. Similarly, the second bushing mount 20 on OEM wheel spindle assembly 10' is configured to receive a forward control link 62, as also illustrated in FIG. 2 (again, only the right-hand side forward control link 62 is illustrated in FIG. 2).

Each OEM wheel spindle 10' also may be provided with a toe link mount 22'. Toe link mount 22' is configured to receive a toe link 57' on OEM multi-link suspension system 14 (the toe link 57' illustrated in FIGS. 2 and 3 is for the right-hand side). The OEM wheel spindle assembly 10' may also be provided with an upper ball joint mount 52' sized to receive a ball joint (not visible in FIGS. 2 and 3) provided on an upper control arm 49' of OEM multi-link suspension system 14.

If it is desired to use the OEM wheel spindle assemblies 10' with the A-arm suspension system 12, it will be necessary to modify or adapt the left and right wheel spindle assemblies 10' to accommodate the various members associated with the A-arm suspension system 12. More specifically, the OEM wheel spindle assembly 10' will need to be provided with a mounting structure suitable for receiving the lower A-arm 46 of suspension system 12. In the particular embodiment shown and described herein, ball joint bracket 24 allows the OEM wheel spindle assembly 10' to be mounted to the lower A-arm of suspension system 12.

Referring now to FIG. 8, ball joint bracket 24 may comprise a spindle plate 26 having an upper end 64 and a lower end 66. Spindle plate 26 may be provided with a plurality of holes 68 therein to allow the spindle plate 26 to be mounted to OEM spindle 10'. In one embodiment, the holes 68 in spindle plate 26 are sized and spaced to align with corresponding hub assembly mounting holes 70 provided in OEM spindle assembly 10'. See also FIGS. 6 and 7. This will allow the ball joint bracket 24 to be easily mounted to the spindle assembly. Spindle plate 26 may also be provided with a clearance opening 72, if required, to provide clearance for a corresponding mounting boss 74 provided on OEM spindle assembly 10'.

Ball joint bracket 24 may also comprise a ball joint plate 28 that extends generally outwardly from the lower end 66 of spindle plate 26. Ball joint bracket 28 may be provided with a ball joint mount 76 sized to receive a mounting stud of lower ball joint 50. See also FIGS. 4 and 5. Ball joint bracket 24 may also comprise a gusset 30 mounted to the spindle plate 26 and ball joint plate 28, as best seen in FIG. 8.

Ball joint bracket 24 may be fabricated from any of a wide range of materials, such as steel or aluminum alloy, that would be suitable for the intended application. Further, ball joint bracket 24 may be formed as a single unitary piece, e.g., by casting or by forging. Alternatively, ball joint bracket 24 may be built-up or assembled from individual metal plates that are then welded together. By way of example, in one embodiment, the ball joint bracket 24 is made from individual steel plates (e.g., for the spindle plate 26, ball joint plate 28, and gusset 30) that are then welded together.

In the particular embodiments shown and described herein, it is necessary to modify the OEM wheel spindle assembly 10' so that the ball joint bracket 24 may be mounted to it in the manner already described. More specifically, and with reference now to FIGS. 6 and 7, the first and second lower bushing mounts 18 and 20 must first be removed in order to provide the necessary clearance for ball joint bracket 24. In one embodiment, the first and second bushing mounts 18 and 20 are removed by machining (e.g., by milling) in order to provide sufficient clearance for ball joint bracket 24. The foregoing modifications result in the production or formation of an intermediate modified spindle 10", as shown in FIG. 7. Thereafter, ball joint bracket 24 may be mounted to the intermediate modified spindle 10" to produce wheel spindle assembly 10. See also FIGS. 4 and 5.

In addition, and as was briefly described above, in many embodiments it will be necessary or desirable to relocate the toe link mount 22', shown in FIG. 6, in order to define a relocated toe link mount 22, shown in FIG. 7. As will be described in further detail below, relocating the toe link mount may be required to allow the suspension system 12 to retain OEM specifications relating to toe angle as a function of suspension travel. If desired, the toe link mount 22' may be relocated either prior to or after the first and second bushing mounts 18 and 20 have been removed.

The wheel spindle assemblies 10 (e.g., modified versions of wheel spindles 10') may be used in the A-arm suspension system 12. As already described, the A-arm suspension system 12 represents a significant reconfiguration of the OEM suspension system 14 to provide for significantly increased space forward of the suspension system 12. Such increased space will be particularly advantageous when converting vehicles for wheelchair use.

For example and with reference now to FIGS. 2, 3, and 11, the front body mounts 40 and 42 of A-arm suspension system 12 are located a considerable distance to the rear and somewhat inboard compared with the locations of the corresponding mounts 40' and 42' provided on OEM suspension system 14, as indicated by arrows 41 and 43 in FIG. 11. However, because the forward control links 62 of the OEM multi-link suspension system 14 were attached to the OEM suspension system 14 near the locations of the front body mounts 40' and 42', the relocation of the front body mounts requires the elimination of the forward control links 62. The elimination of the forward control links 62 in turn requires the lower control link 60 of the OEM suspension system to be replaced by the lower A-arms 46 and 47. When incorporated into the A-arm suspension system 12, these changes result in a substantial increase in available space forward of the A-arm suspension system 12, thereby providing sufficient space for the addition of a deployable ramp system and also increasing substantially the area available for a flat floor space within the vehicle.

For example, the rearward extent of a flat floor area in a vehicle having the multi-link OEM suspension system 14 is indicated by broken line 78 in FIG. 11. In contrast, the rearward extent of the area for a flat floor in a vehicle having the suspension system 12 is indicated by broken line 80. The area between broken line 78 and broken line 80 represents a substantial increase in the area available for a flat floor in the converted vehicle.

Referring now to FIGS. 1 and 9-11, the A-arm suspension system 12 may comprise a frame 32 to which may be mounted the various components of the A-arm suspension system 12. In one embodiment, the frame 32 may comprise an upper or top member 34 and a lower or bottom member 82 that are positioned in generally parallel, spaced-apart relation. Upper and lower members 34 and 82 may be secured together by various cross-members 84 positioned on rear end 86 of frame 32. A left-hand side control member support structure 88 may be used to secure together the left side 44 of upper and lower members 34 and 82, whereas a right-hand side control member support structure 90 may be used to secure together the right side 58 of frame 32. Thus, an upper front portion 92 of frame 32 (i.e., located above the lower or bottom member 82) will be generally open, thereby allowing an interior floor of the vehicle to be expanded into open front portion 92. See also broken line 80 in FIG. 11.

The various elements and members comprising frame 32 may comprise any of a wide range of materials, such as aluminum alloy or steel, that would be suitable for the particular application. In one embodiment, the various members comprising frame 32 may be fabricated from tubular steel having a square cross-section, as depicted in the drawing figures. The left- and right-hand side control arm support structures 88 and 90 may be formed by castings, forgings, or may be built-up from individual components. However, because the construction of frame 32 and control arm support structures 88 and 90 are well within the level of ordinary skill in the art and could be readily provided by persons having ordinary skill in the art after having become familiar with the teachings provided herein, the particular components and construction processes that may be used to fabricate frame 32 and control arm supports 88 and 90 will not be described in further detail herein.

As mentioned earlier, the upper or top member 34 of frame 32 may also define a plurality of body or chassis mounting locations 36, 38, 40, and 42. Each mounting location 36, 38, 40, and 42 may be sized to receive a corresponding body bushing 94 of the type well-known in the art. The body bushings 94 allow the A-arm suspension system 12 to be mounted to the body or chassis of the vehicle. Body bushings 94 may comprise corresponding body bushings from the OEM suspension system 14 or may comprise new components.

The respective left and right rear body mounting locations 36 and 38 may be sized and spaced to correspond to the rear body mounting locations 36' and 38' provided on the OEM suspension assembly 14. See FIG. 2. Therefore the left and right rear body mounting locations 36 and 38 and corresponding body bushings 94 will be aligned with existing rear suspension mounts (not shown) provided on the vehicle chassis. In this regard it should be noted that in many embodiments it will be necessary or desirable to raise the vehicle chassis to provide additional ground clearance for the deployable ramp system. In such embodiments, suitable extended body mounts or spacers 93 may be used to further lift or elevate the vehicle chassis above the suspension system 12. The extended body mounts or spacers 93 may be sized to mount to the existing rear suspension mounts provided on the vehicle chassis. They may also be additionally secured to the vehicle chassis by welding. However, because such extended mounts or spacers 93 could be easily provided by persons having ordinary skill in the art after having become familiar with the teachings provided herein, the particular extended mounts 93 that may be used in conjunction with the present invention will not be described in further detail herein.

The respective left and right front body mounting locations 40 and 42 are located generally rearwardly and slightly inboard of the positions of the corresponding front body mounting locations 40' and 42' provided on OEM suspension assembly 14, as indicated by arrows 41 and 43 in FIG. 11. The relocated left and right front body mounting locations 40 and 42 provide increased clearance to allow a deployable ramp system to be installed on the vehicle and also provide for an increased flat floor area, as already described. Of course, the chassis or body of the converted vehicle will have to be provided with new or relocated suspension mounts 95 sized and located to mate with the left and right front body mounting locations 40 and 42. The new or relocated suspension mounts 95 may be mounted (e.g., by welding) to the vehicle chassis (not shown). Here again, however, because such relocated suspension mounts 95 could be easily provided by persons having ordinary skill in the art after having become familiar with the teachings provided herein, the relocated suspension mounts 95 that may be used in conjunction with the present invention will not be described in further detail herein.

The left- and right-hand side wheel spindles 10 are mounted to the respective left and right sides 44 and 58 of frame assembly 32 by various control arms and linkages. More specifically, and with reference now to FIGS. 4, 5, and 10, the left-hand side wheel spindle assembly 10 is mounted to a lower A-arm 46 and an upper control arm 48. Lower A-arm 46 may comprise a generally A-shaped member that is pivotally mounted to the lower member 82 of frame 32 so that lower A-arm 46 may pivot about pivot axis 96. If desired, eccentric mounting bolts 97 may be used to secure the lower A-arm 46 to the lower member 82 of frame 32. Such eccentric mounting bolts 97 will allow the camber angle of the wheel spindle assembly 10 to be easily adjusted. Lower A-arm 46 may also be provided with a damper or strut mount 98 sized to receive a suitable damper or suspension strut (not shown).

Lower A-arm 46 may be fabricated from any of a wide range of materials, such as steel or aluminum alloys, suitable for the intended application. Consequently, the present invention should not be regarded as limited to A-arms made of any particular material. Moreover, lower A-arm may comprise a single unitary piece, such as may be formed by casting or forging. Alternatively, A-arm 46 may be fabricated from individual pieces or elements that are welded together, as would become apparent to persons having ordinary skill in the art after having become familiar with the teachings provided herein.

Upper control arm 48 is pivotally mounted to the left side control arm support structure 88 so that upper control arm 48 may pivot about pivot axis 11. See FIGS. 1 and 10. In the particular embodiment shown and described herein, upper control arm 48 may comprise the corresponding upper control arm from the OEM suspension system 14. Alternatively, upper control arm 48 could comprise a newly-fabricated part.

The relative locations of the pivot axes 96 and 11 may be selected to provide A-arm the suspension system 12 with a camber curve (i.e., variation in wheel camber with suspension displacement) that is substantially identical to the camber curve associated with the OEM suspension system 14. Alternatively, a different camber curve could be used, if desired. In an embodiment wherein the lower A-arm 46 is mounted to lower member 82 of frame 32 with eccentric mounting bolts 97, the eccentric mounting bolts 97 may be used to provide the camber adjustment.

The left-hand side wheel spindle assembly 10 may be mounted to the lower A-arm 46 and the upper control arm 48 by means of respective ball joints 50 and 52, as best seen in FIG. 5. More specifically, the ball joint plate 28 of ball joint bracket 24 may be mounted to the lower ball joint 50 provided on lower A-arm 46. The existing upper ball joint mount 52 provided on wheel spindle assembly 10 may be mounted to upper ball joint 54 provided on the upper control arm 48. The upper ball joint 54 may comprise the corresponding upper ball joint from the OEM suspension assembly 14, if desired. The fore/aft location of the lower ball joint 50 with respect to the upper ball joint 54 should be selected so as to provide the wheel spindle assembly 10 with desired degree of caster. By way of example, the caster angle of wheel spindle assembly 10 may be selected to be substantially equal to the caster angle of the OEM suspension assembly 14.

Finally, a toe link 56 mounted to the wheel spindle assembly 10 and the control arm support structure 88 is used to control the toe angle of the wheel spindle assembly 10. More specifically, and with reference to FIG. 5, an outboard end 13 of toe link 56 should be mounted to the wheel spindle assembly 10 so that it is generally aligned with ball joint axis 15 defined by the lower and upper ball joints 50 and 56. Depending on the location of the corresponding toe link mount 22' on the OEM spindle assembly 10' (FIG. 6), it may be necessary or desirable to move or relocate the toe link mount 22' to define a relocated toe link mount 22 (FIG. 7) that is substantially aligned with ball joint axis 15. See also FIG. 5.

In addition, and as best seen in FIG. 4, a pivot axis 17 of the outboard end 13 of toe link 56 should be substantially parallel to lower A-arm axis 96. Therefore, it may be necessary to drill or bore a hole in the relocated toe link mount 22 to provide this parallel orientation. Depending on the particular mounting arrangement desired, a mounting stud 19 may be mounted within the hole. The mounting stud 19 will then be aligned with pivot axis 17, as best seen in FIG. 7. If desired, mounting stud 19 may comprise the corresponding mounting stud 19' from the OEM wheel spindle assembly 10'. See FIG. 6. Alternatively, mounting stud 19 could comprise a new part.

With reference now primarily to FIGS. 4 and 10, an inboard end 21 of toe link 56 is pivotally mounted to the control arm support structure 88 so that inboard end 21 toe link 56 may pivot about axis 23. Axis 23 should be substantially parallel to axis 17. If desired, an eccentric mounting bolt 99 may be used to secure the inboard end 21 of toe link 56 to control arm support structure 88. Use of an eccentric mounting bolt 99 will allow the toe angle of the wheel spindle assembly 10 to be easily adjusted.

Finally, the right-hand side wheel spindle assembly may be mounted to the right-hand side 58 of frame assembly 32 in the same manner, i.e., via a lower A-arm 47, an upper control arm 49, and a toe link 57. The particular structural elements and geometric configurations for the right-hand side may likewise be the same as those for the left-hand side. The completed A-arm suspension system 12 may then be mounted to the vehicle.

Having herein set forth preferred embodiments of the present invention, it is anticipated that suitable modifications can be made thereto which will nonetheless remain within the scope of the invention. The invention shall therefore only be construed in accordance with the following claims:

The invention claimed is:

1. An A-arm suspension system, comprising:
   a frame, said frame defining a front end, a rear end, a left side, and a right side, said frame further defining respective left and right rear body mounting locations at about the rear end of said frame and respective left and right front body mounting locations at about the front end of said frame;
   a right side control arm pivotally mounted to the right side of said frame so that at least a portion of said right side control arm is generally aligned with the right front body mounting location on said frame;
   a right side A-arm pivotally mounted to the right side of said frame assembly in generally spaced-apart relation to said right side control arm, said right side control arm and said right side A-arm defining a right side ball joint axis;
   a left side control arm pivotally mounted to the left side of said frame so that at least a portion of said left side control arm is generally aligned with the left front body mounting location on said frame;
   a left side A-arm pivotally mounted to the left side of said frame in generally spaced-apart relation to said left side control arm, said left side control arm and said left side A-arm defining a left side ball joint axis;
   a right side wheel spindle assembly mounted to said right side control arm and said right side A-arm;
   a left side wheel spindle assembly mounted to said left side control arm and said left side A-arm;
   a right side toe link having an outboard end and an inboard end, the outboard end mounted to said right side wheel spindle assembly and the inboard end mounted to said frame; and
   a left side toe link having an outboard end and an inboard end, the outboard end being mounted to said left side wheel spindle assembly and the inboard end mounted to said frame.

2. The suspension system of claim 1, wherein the left and right front body mounting locations on said frame are substantially aligned with the left and right ball joint axes.

3. The suspension system of claim 1, wherein:
   the outboard end of said right side toe link is pivotally mounted to said right side wheel spindle assembly at a location that is substantially aligned with the right side ball joint axis; and wherein
   the outboard end of said left side toe link is pivotally mounted to a location on the left side wheel spindle assembly at a location that is substantially aligned with the left side ball joint axis.

4. The suspension system of claim 3, wherein:
the outboard end of said right side toe link pivots about a pivot axis that is substantially perpendicular to the right side ball joint axis; and wherein
the outboard end of said left side toe link pivots about a pivot axis that is substantially perpendicular to the left side ball joint axis.

5. The suspension system of claim 1, wherein:
the inboard end of said right side toe link is pivotally mounted to the right side of said frame at a location that is substantially aligned with a pivot axis of the right side A-arm; and wherein
the inboard end of the left side toe link is pivotally mounted to a location on the right side of said frame at a location that is substantially aligned with a pivot axis of the left side A-arm.

6. The suspension system of claim 1, further comprising:
a right side ball joint mounted to said right side A-Arm;
a right side ball joint bracket mounted to said right side wheel spindle assembly and to said right side A-arm, said right side ball joint bracket comprising:
a spindle plate having an upper end and a lower end, the spindle plate being mounted to said right side wheel spindle assembly; and
a ball joint plate extending generally outwardly from the lower end of said spindle plate, the ball joint plate being mounted to said right side A-arm;
a left side ball joint mounted to said left side A-arm; and
a left side ball joint bracket mounted to said left side wheel spindle assembly and to said left side A-arm, said left side ball joint bracket comprising:
a spindle plate having an upper end and a lower end, the spindle plate being mounted to said left side wheel spindle assembly; and
a ball joint plate extending generally outwardly from the lower end of said spindle plate, the ball joint plate being mounted to said left side A-arm.

7. The suspension system of claim 6, wherein the right side ball joint bracket further comprises a gusset extending between said spindle plate and said ball joint plate and wherein the left side ball joint bracket further comprises a gusset extending between said spindle plate and said ball joint plate.

8. The suspension system of claim 7, wherein the ball joint plate of the right side ball joint bracket further comprises a ball joint mount sized to receive a stud provided on the right side ball joint mounted to the right side A-arm and wherein the ball joint plate of the left side ball joint bracket further comprises a ball joint mount sized to receive a stud provided on the left side ball joint mounted to the left side A-arm.

9. The suspension system of claim 6, wherein:
the spindle plate of the right side ball joint bracket defines a plurality of holes therein sized to align with corresponding hub assembly mounting holes provided in the right side wheel spindle assembly;
a plurality of fasteners operatively engaged with the hub assembly mounting holes provided in the right side wheel spindle assembly and the mounting holes defined by the spindle plate of the right side ball joint bracket, said plurality of fasteners securing the right side ball joint bracket to the right side wheel spindle assembly; and wherein
the spindle plate of the left side ball joint bracket defines a plurality of holes therein sized to align with corresponding hub assembly mounting holes provided in the left side wheel spindle assembly;
a plurality of fasteners operatively engaged with the hub assembly mounting holes provided in the left side wheel spindle assembly and the mounting holes defined by the spindle plate of the left side ball joint bracket, said plurality of fasteners securing the left side ball joint bracket to the left side wheel spindle assembly.

10. The suspension system of claim 7, wherein the respective ball joint plates, spindle plates, and gussets of the left and right side ball joint brackets are welded together.

11. The suspension system of claim 10, wherein the respective ball joint plates, spindle plates, and gussets of the left and right side ball joint brackets comprise a steel alloy.

12. The suspension system of claim 10, wherein the respective ball joint plates, spindle plates, and gussets of the left and right side ball joint brackets comprise an aluminum alloy.

13. The suspension system of claim 7 wherein the respective ball joint plates, spindle plates, and gussets of the left and right side ball joint brackets comprise a unitary casting.

14. The suspension system of claim 13, wherein said casting comprises a steel alloy.

15. The suspension system of claim 13, wherein said casting comprises an aluminum alloy.

16. The suspension system of claim 7, wherein the respective ball joint plates, spindle plates, and gussets of the left and right side ball joint brackets comprise a unitary forging.

17. The suspension system of claim 16, wherein said forging comprises a steel alloy.

18. The suspension system of claim 16, wherein said forging comprises an aluminum alloy.

19. An A-arm suspension system, comprising:
a frame, said frame defining a front end, a rear end, a left side, and a right side, said frame further defining respective left and right rear body mounting locations at about the rear end of said frame and respective left and right front body mounting locations at about the front end of said frame;
a right side control arm pivotally mounted to the right side of said frame so that at least a portion of said right side control arm is generally aligned with the right front body mounting location on said frame;
a ball joint mounted to said right side control arm;
a right side A-arm pivotally mounted to the right side of said frame assembly in generally spaced-apart relation to said right side control arm;
a ball joint mounted to said right side A-arm, the ball joints mounted to said right side control arm and said right side A-arm defining a right side ball joint axis;
a left side control arm pivotally mounted to the left side of said frame so that at least a portion of said left side control arm is generally aligned with the left front body mounting location on said frame;
a ball joint mounted to said left side control arm;
a left side A-arm pivotally mounted to the left side of said frame in generally spaced-apart relation to said left side control arm;
a ball joint mounted to said left side A-arm, the ball joints mounted to said left side control arm and said left side A-arm defining a left side ball joint axis;
a right side wheel spindle assembly having an upper ball joint mount and lacking a lower ball joint mount, the upper ball joint mount being operatively engaged with the ball joint provided on said right side control arm;

a right side ball joint bracket mounted to said right side wheel spindle assembly, said right side ball joint bracket comprising:
  a spindle plate having an upper end and a lower end;
  a ball joint plate extending generally outwardly from the lower end of said spindle plate;
  a ball joint mount provided on said ball joint plate, said ball joint mount being operatively engaged with the ball joint provided on the right side A-arm; and
  a gusset extending between said spindle plate and said ball joint plate;

a left side wheel spindle assembly having an upper ball joint mount and lacking a lower ball joint mount, the upper ball joint mount being operatively engaged with the ball joint provided on said left side control arm; and a left side ball joint bracket mounted to said left side wheel spindle assembly, said left side ball joint bracket comprising:
  a spindle plate having an upper end and a lower end;
  a ball joint plate extending generally outwardly from the lower end of said spindle plate;
  a ball joint mount provided on said ball joint plate, said ball joint mount being operatively engaged with the ball joint provided on the left side A-arm; and
  a gusset extending between said spindle plate and said ball joint plate.

\* \* \* \* \*